United States Patent
Soble et al.

Patent Number: 6,027,658
Date of Patent: Feb. 22, 2000

[54] FLUID FILTRATION, RECIRCULATION AND DELIVERY APPARATUS AND METHOD

[75] Inventors: Richard M. Soble, Highland Park; George V. Strapko, Northbrook, both of Ill.

[73] Assignee: Xonex Corporation, Northbrook, Ill.

[21] Appl. No.: 09/163,585

[22] Filed: Sep. 30, 1998

Related U.S. Application Data

[60] Provisional application No. 60/060,444, Sep. 30, 1997.

[51] Int. Cl.⁷ .................................................. B01D 17/028
[52] U.S. Cl. .......................... 210/801; 210/804; 210/805; 210/167; 210/195.1; 210/257.1; 210/258; 210/305; 210/307
[58] Field of Search ........................... 210/801, 804–806, 210/167, 195.1, 257.1, 258, 305, 307, 320, 521

[56] References Cited

U.S. PATENT DOCUMENTS

| | | | |
|---|---|---|---|
| 4,052,311 | 10/1977 | Martin | 210/223 |
| 4,469,582 | 9/1984 | Sublette et al. | 204/302 |
| 4,772,402 | 9/1988 | Love | 210/804 |
| 5,236,585 | 8/1993 | Fink | 210/242.3 |
| 5,454,937 | 10/1995 | Lewandowski | 210/104 |
| 5,458,770 | 10/1995 | Fentz | 210/168 |
| 5,738,782 | 4/1998 | Schafer et al. | 210/171 |

*Primary Examiner*—Peter A. Hruskoci
*Attorney, Agent, or Firm*—Brinks Hofer Gilson & Lione

[57] ABSTRACT

An in process fluid delivery reservoir and method is disclosed for continuously filtering particulate matter and oils from industrial fluids, such as coolants, oils, aqueous emulsions, etc., which are necessary in the operation of machine tools. The reservoir utilizes a primary containment area with a primary chip screen and a first baffle to trap much of the particulate matter and contain tramp oil. The reservoir also contains secondary and tertiary containment areas which utilize upper and bottom baffles to further trap the particulate matter and tramp oils, when said reservoir is utilized with aqueous emulsion. The industrial fluid remaining in the tertiary containment area is ready to be delivered to the machine tool for reuse.

13 Claims, 2 Drawing Sheets

FLUID FILTRATION, RECIRCULATION AND DELIVERY APPARATUS AND METHOD

This application is a continuation of provisional U.S. Application Ser. No. 60/060,444, filed Sep. 30, 1997.

TECHNICAL FIELD

The present invention relates to an apparatus and method for filtering foreign particulate matter and oils from industrial fluids, and more specifically, the present invention relates to a reservoir or tank for filtering industrial fluids, such as coolants, detergents, oils, aqueous emulsions, etc., used in machining, finishing and cleaning without the use of any filter media or mechanical assistance (i.e. filter cloth, centrifuge or cyclonic means).

BACKGROUND OF THE INVENTION

Industrial fluids, such as coolants, detergents, oils, aqueous emulsions, etc. which are used to cool, lubricate, flush and clean in operations utilizing industrial machines such as machining, finishing and cleaning, have a usable life which is, in part, related to the amount and rate of contamination introduced into the fluids. The contamination is primarily in the form of particulate (solid matter) and/or liquid matter (oils, greases, silicones) which are foreign to the virgin fluid. Reducing the amount of contaminants introduced into the fluids increases the useable life of the industrial fluid.

Since one often cannot reduce the amount of contaminants introduced into the industrial fluids completely, another way to extend the useable life of the fluid is to treat or filter the industrial fluid, thereby removing some or all of the contaminants. Conventional treatment of contaminated fluid utilizes a fluid processing device. The contaminated or spent fluid is transferred from the delivery tank or reservoir of a machine tool to the fluid processing device. A filtration process is then utilized to filter out or remove contaminants, thereby increasing the useful life of the industrial fluid. The filtered industrial fluid is returned to the delivery tank or reservoir. The filtration is accomplished via filter cloth and/or mechanical assistance such as centrifuge or cyclonic means.

A coolant processing system using such a method is disclosed in U.S. Pat. No. 4,772,402. This coolant processing system apparatus is placed near a machine tool in need of such processing. The machine tool coolant is then pumped from the machine tool reservoir (tank) into the coolant processing system. The apparatus processes the coolant, and the coolant is then returned to the machine tool reservoir (tank).

The system described above and similar systems have limited effectiveness due to the frequency (or lack thereof of use. If the systems are not utilized on a continuous basis, contaminants will accumulate in the machine tool reservoir (tank). These accumulating contaminants may be delivered throughout the machine tool thereby decreasing the effectiveness of the fluid and increasing the chance that the machine tool or workpieces will be damaged.

Further, conventional fluid delivery tanks or reservoirs, such as those used in a typical coolant delivery operation for a machine tool, are primarily holding and recirculation tanks with limited filtration and oil separation ability. Contaminants end up polluting the entire tank area where they are prone to be recirculated by the pump utilized in the recirculation process prior to the filtration process. The contaminants may then directed to the point of discharge reducing the cooling or lubricating effect of the fluid, or damaging the power tool utilizing the fluid or the workpiece being processed.

Another problem with the current processing systems is the limited containment areas used to trap the oils and particulate matter during filtration and disposal. The entire tank contents needs to be emptied and cleaned of spent liquid, a major maintenance undertaking.

SUMMARY OF THE INVENTION

The present invention greatly extends the useable life of industrial fluids thereby limiting the need for their disposal and secondary processing. By capturing, containing and removing the particulate matter and oils "in process," without any filter media or mechanical assistance during the operation of the machine tool, the filtering or processing of the fluid occurs as ongoing process, and is an improvement over systems in which the industrial fluids must be removed to a separate reservoir prior to any filtration process. This ongoing process continuously reduces the amount of particulate matter and the amount of unwanted oil found in the industrial fluid at any one time, and allows for the removal and disposal of the particulate matter and oil in concentrated form when required.

The above object is achieved in the present invention by utilizing a reservoir or tank that is a part of the fluid delivery system which, when coupled to a pump, supplies necessary fluid to the required point of delivery. The used fluid then flows back into the tank and through a series of filtration and separation devices, such as screens, troughs, baffles and weir assemblies, which process the used fluid by trapping foreign particulate matter and oils. The process occurs while the machine tool is in use without any filter cloth, centrifuge, cyclonic means, or any other mechanical means. The tank, which is a closed loop system, greatly extends the usable life of the fluids over current delivery systems.

The apparatus according to the present invention has two containment areas. The first, a particulate containment area, is used to settle out particulate matter by greatly extending the fluid path to gain more residence time to drop the particulate out of suspension before coming in contact with any baffling or weir system. This fluid extension or "laminar flow" path encourages dropout of particulate matter in a primary containment trough for ease of change and cleanouts. The fluid, which might contain floating contaminants (particulate or oil), flows into the secondary containment area and is trapped by a double baffle or weir system before it passes into the clean side of the reservoir. Typically, a pump discharges the clarified liquid for reuse.

Thus, the present invention greatly extends fluid life by filtering and separating out the contaminants continuously in-process without filter cloth, cyclonic or mechanical devices, and further makes any required tank cleaning simpler with easily accessible tank compartments, such as a primary chip screen and trough, a secondary containment area, and a tertiary containment area. The net result is lower fluid expenditures due to extending the fluid's working life and ease of performing maintenance tasks by simplifying access and removal areas of containment.

Other features and advantages of the present invention will be apparent to those having ordinary skill in the art based on the accompanying drawings and description.

DETAILED DESCRIPTION OF THE INVENTION

Figure 1:
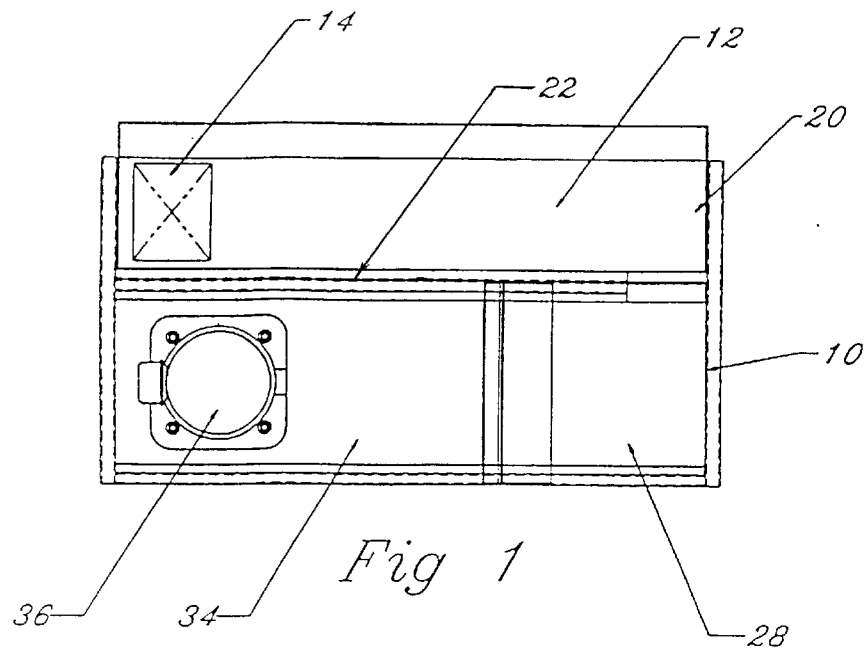
FIG. 1 is a top perspective view of the fluid delivery reservoir embodying the present invention.

FIG. 1 shows a top view of the fluid delivery reservoir 10 in accordance with the present invention. The reservoir 10 is configured to trap or separate contaminants or particulate matter, such as metal chips, metal fines and grinding swarf, and also tramp oils from industrial fluids that are used in machine tools. The industrial fluids, after passing through the reservoir and having had these contaminants removed are ready to be used in the machine tool again, thereby reducing greatly the risk of these contaminants damaging the machine tools. Further, the reservoir 10 can be used "in process," or while the machine tool is being used, thereby eliminating the need for the machine tool operator to stop working in order to clean the industrial fluid. Therefore, the reservoir 10 is a faster, more efficient system than those systems that can only clean the particulate matter and oils when the machine tool is not in use.

The reservoir 10 also provides a system of trapping or removing unwanted particulate matter and oils from the industrial fluid without the need for any filter media, such as filter cloth, and without mechanical assistance, such as centrifuge or cyclonic means. The reservoir 10 is therefore less expensive than other systems that utilize these materials and means.

The reservoir, or tank, 10 is preferably made of a material which is resistant to corrosion, since the industrial fluids that will come in contact with the reservoir 10 may be harsh on the reservoir 10. Although metal is the preferred material; plastic, resin or some other material may be used.

The top view of FIG. 1 shows the three areas of containment used by the reservoir 10 as it separates or removes particulate matter and oils from the industrial fluid used by the machine tool (not shown): the primary containment area 24, the secondary containment area 28, and the tertiary containment area 34. Industrial fluid used by a machine tool and now containing particulate matter and oil is sent to the reservoir 10 and in particular to the fluid return trough 12. The industrial fluid is usually gravity fed from the machine tool into the fluid return trough 12 but it may be pumped to the trough 12. The fluid entering the fluid return trough 12 is usually returning directly from the machine tool and therefore contains the greatest amount of particulate matter and oil.

Figure 1A:
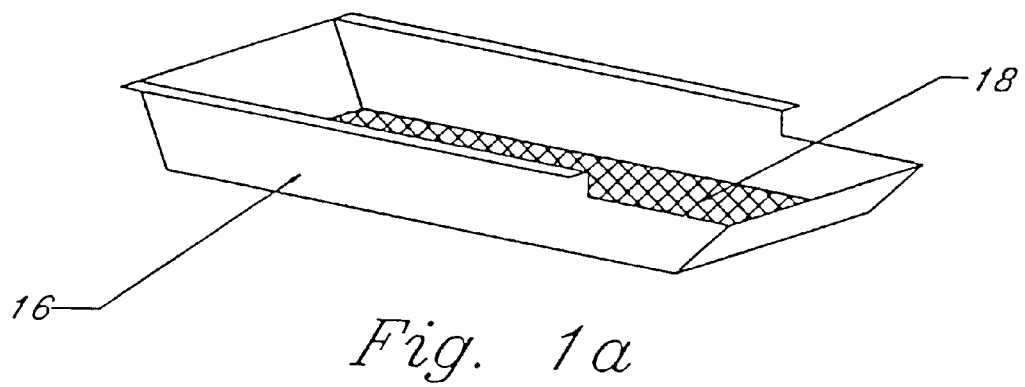
FIG. 1a is a perspective view of the primary chip screen utilized in the present invention.

The trough 12 contains a removable primary chip basket 16 with a perforated or wire mesh screen 18 that traps particulate matter. The chip basket is shown in FIG. 1a. The size of the particulate matter that is trapped in the screen 18 will depend on the size of the screen mesh size 18. The chip basket 16 is removable to simplify the disposal of particulate matter trapped in the screen 18. The chip basket 16 and screen 18 also help slow the flow of the incoming fluid thereby enhancing the separation process.

Once the industrial fluid is fed into the trough and passes through the screen, the fluid then enters the first containment area, or primary containment area 24. A cutout 14 in the bottom of the fluid return trough 12 allows the fluid to enter the primary containment area 24.

The fluid return trough 12 and the primary containment area 24 of the reservoir 10 are configured such that the fluid travels by laminar flow in a travel path resembling a U-shape. In order to create such a fluid travel path, a horizontal plate 22 is located in the primary containment area which forces the fluid to travel lengthwise down the primary containment area. Multiple horizontal plates may be used. This path is designed to slow the flow of the incoming fluid and extend its travel path thereby allowing the maximum separation time of the solid particulates and oils from the fluid. The return trough 12 and the cutout 14 direct the fluid into the primary containment area 24. Once in the primary containment area 24, the particulate matter begins to settle at the bottom of the area 24.

A great majority of the particulate matter (about 95% by weight) drop out of suspension and are contained in the primary particle reservoir 24 and are prohibited from traveling any further. The travel path of the fluid, which resembles a U-shape creating a longer travel path than existing devices, accomplishes this drop out rate. These longer travel paths create a maximum separation time for the solids and free floating oils to be separated.

Figure 2:
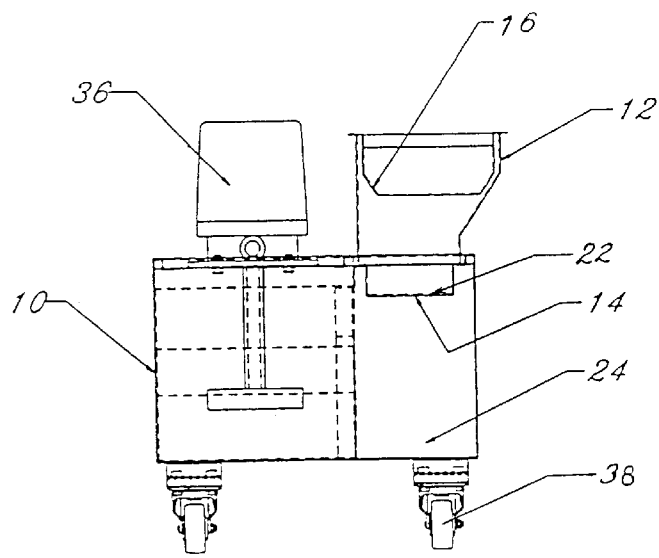
FIG. 2 is an end perspective view of the fluid delivery reservoir embodying the present invention.

FIG. 2 shows a side view of the reservoir 10. The relationship between the trough 12, the chip basket 16, and the primary containment area 24 is further shown. The fluid is fed into the trough 12 and travels through the chip basket 16. The fluid then flows from the trough 12 into the primary containment area 24 through the cutout 14. It is this U-shaped path that provides the reduced speed and increased separation time in order to increase the amount of particulate matter that is removed from the fluid at this stage.

Once the fluid travels through the primary containment area 24 and a majority of the particulate matter has been removed; the fluid passes over a first baffle 26 into the secondary containment area 28.

Figure 3:
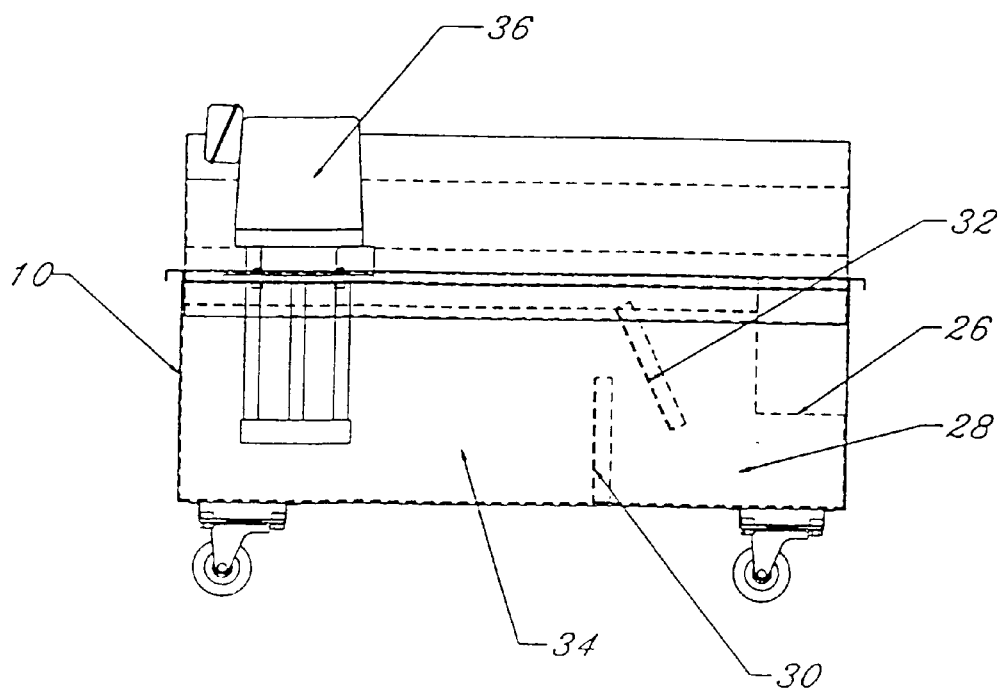
FIG. 3 is a side perspective view of the fluid delivery reservoir embodying the present invention.

FIG. 3 is a side view of the reservoir 10 showing the secondary containment area 28 and the tertiary containment area 34. The fluid exits the primary containment area 24 and next flows over the first baffle or weir 26 into the secondary containment area 28. The first baffle 26 is configured and positioned to prohibit the drop out particulate matter removed in the primary containment area 24 from traveling into the secondary containment area 28.

The secondary containment area 28 contains two additional baffles or weirs, the bottom baffle 30 and the upper baffle 32, which are located and configured to further remove particulate matter and oil from the industrial fluid as the fluid passes through the secondary containment area 28.

As shown in FIG. 3, the bottom baffle 30 is located in the bottom of the secondary containment area 28, and works to contain any particulate matter which may have escaped separation in the primary containment area 24, or any matter that may have floated over the first baffle 26. The upper baffle 32 is located at the top of the secondary containment area 28 and configured to contain or trap any floating particulate matter or oils, which may have escaped separation in the primary containment area 24.

The secondary containment area 28 can be skimmed with an oil skimmer or other device (not shown) to remove the foreign matter, oil or floating particles trapped in the secondary containment area 28.

The fluid travels through the secondary containment area 28 by travelling under the upper baffle 32 and over the bottom baffle 30, and in doing so, the particulate matter and oil is trapped by the particular baffles. The bottom baffle 30 and upper baffle 32 can be placed in any order, and more than one of each may be used in the reservoir 10.

Between the chip basket 16, the primary containment area 24, the first baffle 26, the bottom baffle 30 and the upper baffle 32, most of the unwanted particulate matter and oil have been separated from the industrial fluid. The fluid is now ready to be used again in the machine tool.

The fluid exits the secondary containment area 28 and travels into the tertiary containment area 34. The fluid located in the tertiary containment area 34 has had the particulate matter and oil separated out and can be pumped back to the machine tool via a pump 36 located in or near the tertiary containment area 34.

The reservoir 10 can be fitted with wheels 38 so that the reservoir 10 can be easily moved from location to location along with the machine tool, or in order to be used with another machine tool.

The foregoing detailed description of the invention is intended to be illustrative and not intended to limit the scope of the invention. Changes and modifications are possible with respect to the foregoing description, and it is understood that the invention may be practiced otherwise than that specifically described herein and still is within the scope of the claims.

What is claimed is:

1. An in process fluid delivery reservoir apparatus for continuously separating particulate matter from industrial fluids comprising:
   (a) an elongated fluid return trough having a cutout formed in the bottom at one end, said fluid return trough configured to receive said industrial fluid which flows the length of said trough and passes through said cutout;
   (b) an elongated primary containment area, said primary area being configured such that said industrial fluid, that passes through said cutout is received in one end of said primary area and flows toward the other end of said primary area, the fluid return trough and the primary containment area being configured such that said industrial fluid travels in a U-shaped in order to increase the travel path of said industrial fluid, thereby creating a maximum separation time to separate particulate matter from said industrial fluid; said primary containment area further containing a first baffle located at said other end of said primary area and configured such that said industrial fluid must flow over said first baffle in order to exit said primary containment area;
   (c) a secondary containment area located adjacent to said primary containment area, said secondary area containing at least two baffles, an upper baffle and a bottom baffle, said upper and bottom baffles configured to separate particulate matter from said industrial fluids, said secondary containment area configured such that said industrial fluid must flow past said upper and bottom baffles thereby further separating said particulate matter from said industrial fluids;
   (d) a tertiary containment area located adjacent to said secondary containment area, said tertiary area configured to contain said industrial fluid after said industrial fluid exits said secondary containment area, prior to recirculating said industrial fluid for use, said reservoir apparatus configured to create a laminar flow for the removal of particulate matter from said industrial fluid due to the travel of said industrial fluid from said elongated fluid return trough to to said secondary area to said tertiary area, thereby increasing the amount of time said industrial fluid is in process and increasing the amount of particulate matter removed from said industrial fluid.

2. The reservoir apparatus as recited in claim 1, further comprising a chip basket, said basket containing a mesh screen to separate particulate matter which is larger than the mesh size of the screen.

3. The reservoir apparatus as recited in claim 2, wherein said chip basket is removable to assist in cleaning.

4. The reservoir apparatus as recited in claim 1, wherein said first baffle prohibits the particulate matter that has been separated in the primary containment area from entering the secondary containment area.

5. The reservoir apparatus as recited in claim 1, wherein said upper baffle traps any floating contaminants from said industrial fluid.

6. The reservoir apparatus as recited in claim 1, wherein said bottom baffle further separates particulate matter from said industrial fluid as said industrial fluid flows over said bottom baffle.

7. The reservoir apparatus as recited in claim 1, further comprising a pump, said pump located on or near said reservoir apparatus to pump said industrial fluid from said tertiary containment area for further use.

8. An in process method for removing particulate matter from an industrial fluid for use with a machine tool comprising the steps of:
   (a) passing an industrial fluid containing particulate matter from a machine tool into an elongated fluid return trough having a cutout formed in the bottom at one end such that industrial fluid flows the length of said elongated fluid return trough and passes through said cutout into an end of a primary containment area of a fluid delivery reservoir and flows therethrough toward the other end of said elongated primary containment area during the operation of said machine tool;
   (b) separating said particulate matter in said elongated fluid return trough and said elongated primary containment area by forcing said industrial fluid to travels in a U-shape path configured between said return trough and said primary containment area, thereby increasing the travel path of said industrial fluid, and creating a maximum separation time to separate particulate matter from said industrial fluid;
   (c) prohibiting the passage of said particulate matter from said primary containment area to a secondary containment area by utilizing a first baffle, said first baffle configured such that said industrial fluid must flow over said first baffle in order to exit said primary containment area;
   (d) trapping additional particulate matter in said secondary containment area by utilizing a bottom baffle and an upper baffle, such that said particulate matter must flow past said bottom and upper baffles in order to pass through said secondary containment area and into a tertiary containment area; and
   (e) storing said industrial fluid in said tertiary containment area prior to being pumped back to said machine tool for use.

9. The method as set forth in claim 8, wherein said trough includes a chip basket, said basket containing a mesh screen to separate particulate matter which is larger than the mesh size of the screen.

10. The method as set forth in claim 9, wherein said chip basket is removable to assist in cleaning.

11. The method as set forth in claim 8, wherein said upper baffle traps any floating contaminants from said industrial fluid.

12. The method as set forth in claim 8, wherein said bottom baffle further separates particulate matter and oils from said industrial fluid as said industrial fluid flows over said bottom baffle.

13. The method as set forth in claim 8, further comprising the step of pumping said industrial fluid from said tertiary containment area for further use.

* * * * *